(12) United States Patent
Ishii

(10) Patent No.: US 8,290,262 B2
(45) Date of Patent: Oct. 16, 2012

(54) COLOR PROCESSING APPARATUS AND METHOD THEREOF

(75) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 12/511,556

(22) Filed: Jul. 29, 2009

(65) Prior Publication Data

US 2010/0054589 A1  Mar. 4, 2010

(30) Foreign Application Priority Data

Sep. 1, 2008 (JP) .................................. 2008-223921

(51) Int. Cl.
*G06K 9/00* (2006.01)

(52) U.S. Cl. ...................................................... 382/167

(58) Field of Classification Search .......... 382/162–167, 382/118, 282–283; 358/1.9, 2.1, 516–523; 345/589–604; 348/221.1–225.1, 655
See application file for complete search history.

(56) References Cited

U.S. PATENT DOCUMENTS

| | | | |
|---|---|---|---|
| 6,608,925 B1 | 8/2003 | Edge et al. | |
| 6,816,611 B1 | 11/2004 | Hagiwara et al. | 382/165 |
| 7,120,295 B2 | 10/2006 | Edge et al. | |
| 7,619,773 B2 | 11/2009 | Haikin et al. | |
| 7,697,167 B2 * | 4/2010 | Hatori | 358/2.1 |
| 7,755,637 B2 * | 7/2010 | Newman | 345/589 |
| 7,876,970 B2 | 1/2011 | Goma et al. | |
| 8,013,903 B2 | 9/2011 | Ohga | |
| 8,164,650 B2 * | 4/2012 | Hasegawa | 348/223.1 |
| 2003/0035159 A1 | 2/2003 | Nakami | |
| 2004/0246506 A1 | 12/2004 | Hoshuyama et al. | |
| 2005/0168596 A1 | 8/2005 | Ito et al. | |
| 2005/0265625 A1 | 12/2005 | Li et al. | |
| 2006/0192861 A1 | 8/2006 | Ohga | |
| 2006/0274342 A1 | 12/2006 | Haikin et al. | |
| 2006/0290954 A1 | 12/2006 | Stokes et al. | |
| 2007/0165945 A1 | 7/2007 | Goma et al. | |
| 2009/0010535 A1 | 1/2009 | Koishi | |
| 2009/0067708 A1 | 3/2009 | Maier | |
| 2010/0026837 A1 | 2/2010 | Koishi | |
| 2010/0053360 A1 | 3/2010 | Hasegawa | |
| 2010/0053381 A1 | 3/2010 | Hasegawa | |

(Continued)

FOREIGN PATENT DOCUMENTS

JP   2000-48184   2/2000

(Continued)

OTHER PUBLICATIONS

Henry A Rowley et al., "Neural Network-Based Face Detection," *IEEE Transactions on Pattern Analysis and Machine Intelligence*, vol. 20, No. 1 (Jan. 1998) pp. 1-28.

(Continued)

*Primary Examiner* — Ishrat I Sherali

(74) *Attorney, Agent, or Firm* — Fitzpatrick, Cella, Harper & Scinto

(57) ABSTRACT

A first processor calculates a white point of a pixel of interest of image data from surrounding pixels of the pixel of interest, and executes adaptation processing using the calculated white point. A second processor executes adaptation processing using a fixed white point of image data. A selector selects an area of input image data. A color converter executes color conversion of the input image data using the first or second processor corresponding to the selected area.

8 Claims, 5 Drawing Sheets

U.S. PATENT DOCUMENTS

2010/0165137 A1    7/2010  Koishi

FOREIGN PATENT DOCUMENTS

| JP | 2006-313465 | 11/2006 |
|---|---|---|
| WO | 2007/007798 A1 | 1/2007 |
| WO | 2008/050761 A1 | 5/2008 |

OTHER PUBLICATIONS

Ming-Hsuan Yang et al., "Detecting Faces in Images: A Survey," *IEEE Transactions on Pattern Analysis and Machine Intelligence*, vol. 24, No. 1 (Jan. 2002) pp. 34-58.

CIE Technical Report "A Color Appearance Model for Color Management Systems: CIECAMO2" CIE159: 2004.

Hiroshi Yamaguchi et al., "A Study of Simultaneous Lightness Perception for Stimuli with Multiple Illumination Levels" *Twelfth Color Imaging Conference*, (Sep. 2004) pp. 22-28.

Jingtao Kuang et al., "iCAM06: A refined image appearance model for HDR image rendering," *Journal of Visual Communication*, vol. 18, Issue 5, (2007) pp. 406-414.

U.S. Appl. No. 12/511,587, Naoyuki Hasegawa, filed Jul. 29, 2009, pending.

* cited by examiner

FIG. 4

| CAM PARAMETER | | | | | |
|---|---|---|---|---|---|
| Xw : 95.05   Yw : 100.0   Zw : 108.9 <br> La : 20.0   Yb : 20.0 <br> Surround : average(c : 0.69  Nc : 1.0  F : 1.0) | | | | | |
| 729   (NUMBER OF MEASURED COLORS) | | | | | |
| R | G | B | Xi | Yi | Zi |
| 0 | 0 | 0 | 0.52 | 0.55 | 0.59 |
| 0 | 0 | 32 | 0.88 | 0.95 | 0.98 |
| 0 | 0 | 64 | 5.59 | 6.12 | 7.12 |
| 0 | 0 | 96 | 8.88 | 9.25 | 11.2 |
| 0 | 0 | 128 | 9.61 | 10.5 | 12.3 |
| . | . | . | . | . | . |
| . | . | . | . | . | . |
| . | . | . | . | . | . |
| . | . | . | . | . | . |
| 255 | 255 | 224 | 77.8 | 84.5 | 76.7 |
| 255 | 255 | 255 | 82.1 | 86.3 | 99.7 |

FIG. 5A

| -1 | 0 | 1 |
|---|---|---|
| -2 | 0 | 2 |
| -1 | 0 | 1 |

FIG. 5B

| -1 | -2 | -1 |
|---|---|---|
| 0 | 0 | 0 |
| 1 | 2 | 1 |

COLOR PROCESSING APPARATUS AND METHOD THEREOF

BACKGROUND OF THE INVENTION

1. Field of the Invention

The present invention relates to color processing that performs color conversion based on a color appearance model.

2. Description of the Related Art

The Commission Internationale de L'eclairage (CIE) specifies a color appearance model (CAM) which converts tristimulus values, i.e., XYZ values of a certain color into attribute values (perceptual lightness J value, perceptual chroma C value, and perceptual hue h value) that represent color appearance. For example, CIECAM02 specified by reference 1 (CIE TECHNICAL REPORT "A COLOR APPEARANCE MODEL FOR COLOR MANAGEMENT SYSTEMS: CIECAM02" CIE159: 2004, ISBN3901906290) models a visual phenomenon such as adaptation to illuminating light using mathematical expressions. According to CIECAM02, parameters indicating viewing conditions of an image on the input side of the image, and those indicating viewing conditions of the image on the reproduction side of the image are configured. When a color value on the input side is forward converted into that on a color appearance space, and the converted value is then inversely converted into a color value on the reproduction side, the color appearance in a viewing environment on the input side can match that in a viewing environment on the reproduction side. For this reason, the CAM is popularly used in a color management system (CMS) that consolidates color spaces and color reproduction characteristics of a plurality of different devices.

In recent years, the CIE has proposed an image adaptive color appearance model (iCAM: image color appearance model). iCAM enhances color processing of a color appearance model (CAM) in consideration of local color adaptation processing and frequency characteristics of the vision. The local color adaptation processing of iCAM defines a visual field of a viewer, calculates viewing condition parameters as conversion parameters of the CAM based on pixel data distributed in the visual field, and executes color conversion by applying the viewing condition parameters to respective pixels of an image.

iCAM can express lightness levels and colors perceived by a human as numerical values, and is used in, for example, a technique for converting the appearance of lightness levels and colors perceived by a human in a photographing scene into those that can be reproduced by an image output device. More specifically, iCAM is used in a dynamic range compression technique required to preferably reproduce a high-dynamic-range (HDR) image. For example, reference 2 (Japanese Patent Laid-Open No. 2006-313465) proposes tonality compression processing which applies a technique of iCAM06 that adopts the concept of local adaptation processing (see Kuang, J., Johnson, G. M., Fairchild M. D. "iCAM06: A refined image appearance model for HDR image rendering" Journal of Visual Communication, 2007).

However, upon application of the local adaptation processing, some images may cause failures in reproduction of colors and tones. When an image of a person is reproduced using iCAM, if an object having a high-chroma color exists around a face-image area, the color of a face image becomes unnatural. For example, when a red object exists near a face image, the flesh color of the face image is reproduced to be greenish. When a cyan object exists, the flesh color is reproduced to be magenta-tinged. In other words, even in images which are obtained by photographing an identical person and have an identical flesh color, consistency of flesh color reproduction cannot be obtained depending on objects included in the images, and preferred image reproduction cannot often be obtained.

iCAM determines a white point (adapting white point) as one of the conversion parameters from pixel values in a surrounding area of image data of interest. Therefore, an adapting white point of a solid area (flat part) in an image is also determined from pixel values in a surrounding area, and processing is applied to the solid area based on different adapting white points. As a result, the solid area cannot be preferably reproduced.

SUMMARY OF THE INVENTION

In one aspect, a color processing method which is carried out in an information processing apparatus, the method comprising the steps of: calculating a white point of a pixel of interest of image data from surrounding pixels of the pixel of interest; executing adaptation processing using the calculated white point; executing adaptation processing using a fixed white point of image data; selecting an area of input image data; and executing color conversion of the input image data using the adaptation processing in the first or second executing step corresponding to the selected area.

According to the aspect, the color of a predetermined area in an image can be preferably reproduced upon execution of color conversion. Particularly, a flat part of the image can be preferably reproduced.

Further features of the present invention will become apparent from the following description of exemplary embodiments with reference to the attached drawings.

BRIEF DESCRIPTION OF THE DRAWINGS

FIG. 4 is a view for explaining the format of a device characteristic data.

FIGS. 5A and 5B are views showing Sobel filters of 3×3 pixels.

DESCRIPTION OF THE EMBODIMENTS

Color processing according to embodiments of the present invention will be described hereinafter with reference to the drawings.

First Embodiment

[Apparatus Arrangement]

Figure 1:
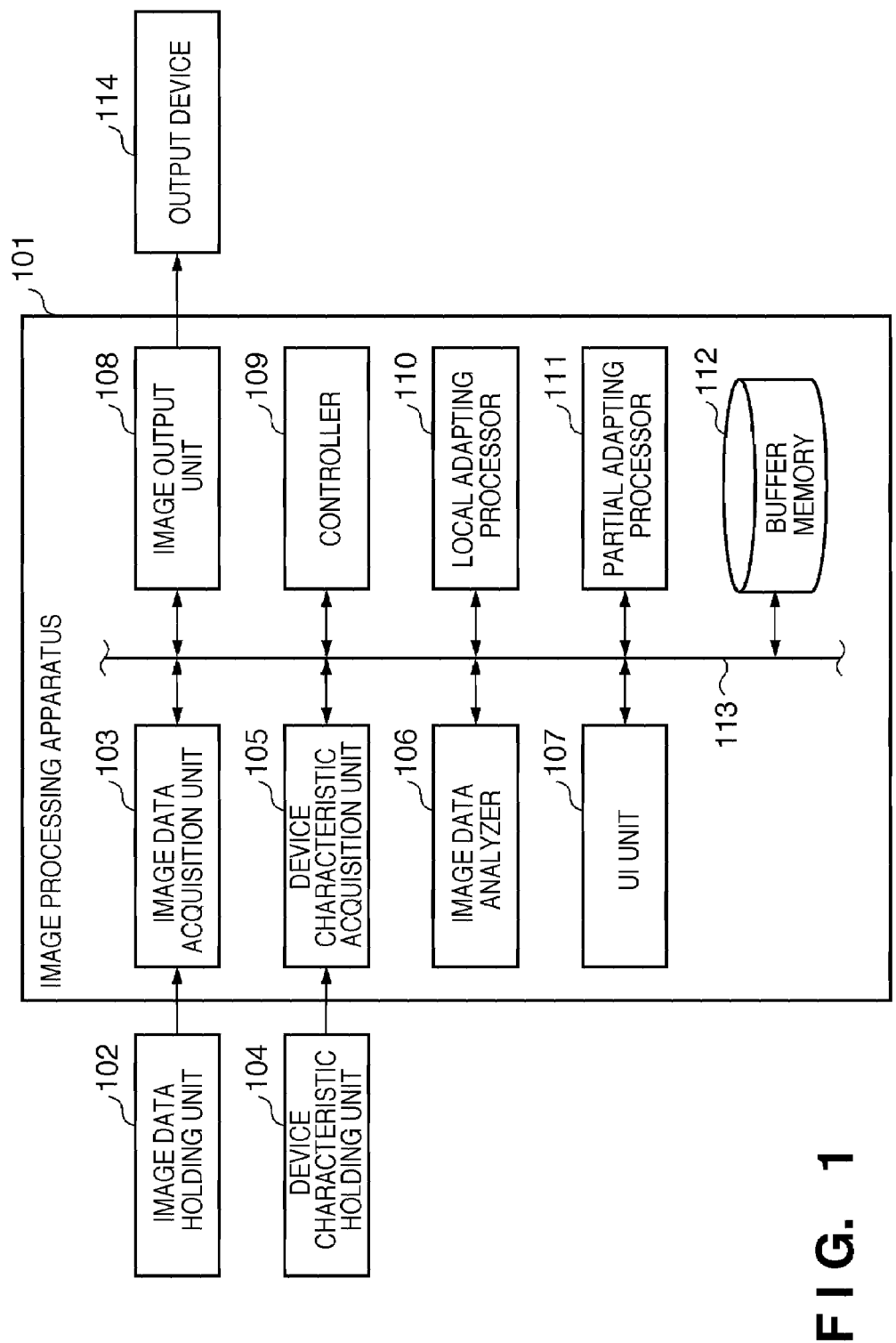
FIG. 1 is a block diagram showing the arrangement of an image processing apparatus (color processing apparatus) according to an embodiment.

FIG. 1 is a block diagram showing the arrangement of an image processing apparatus (color processing apparatus) according to an embodiment.

A controller 109 includes a one-chip microprocessor (CPU), and executes various programs stored in an internal read-only memory (ROM) using an internal random access memory (RAM) and a buffer memory 112 as a work memory. Programs to be executed by the controller 109 via a system bus 113 include a control program required to control respective units to be described later, and a program of image processing to be described later.

A UI unit 107 includes a display unit such as a liquid crystal panel (LCD) and an input unit including a touch panel, or keys or a dial, and provides a user interface (UI) to be described later.

An image data holding unit 102 is a memory which holds image data as a conversion source. A device characteristic holding unit 104 is a memory which holds device characteristic data. Note that the image data and device characteristic data may be stored in a predetermined area of a memory such as a memory card to integrate the image data holding unit 102 and device characteristic holding unit 104.

An image data acquisition unit 103 acquires image data from the image data holding unit 102. A device characteristic acquisition unit 105 acquires device characteristic data from the device characteristic holding unit 104.

When the image data holding unit 102 and device characteristic holding unit 104 are configured using a memory card, the image data acquisition unit 103 and device characteristic acquisition unit 105 may be configured as, e.g., an interface such as a memory card reader. Alternatively, the image data acquisition unit 103 and device characteristic acquisition unit 105 may be configured as a serial bus interface such as USB (Universal Serial Bus), and image data and device characteristic data may be directly acquired from an image input device such as a digital camera without the intervention of a memory.

An image output unit 108 is a serial bus interface such as USB, which outputs image data processed by an image processing apparatus 101 to an output device 114 such as a monitor or printer. The processed image data may be saved in an external memory connected to the image processing apparatus 101.

An image data analyzer 106 analyzes image data stored in the buffer memory 112. A local adapting processor 110 applies local adaptation processing to image data. A partial adapting processor 111 applies partial adaptation processing to image data.

[User Interface]

Figure 2:
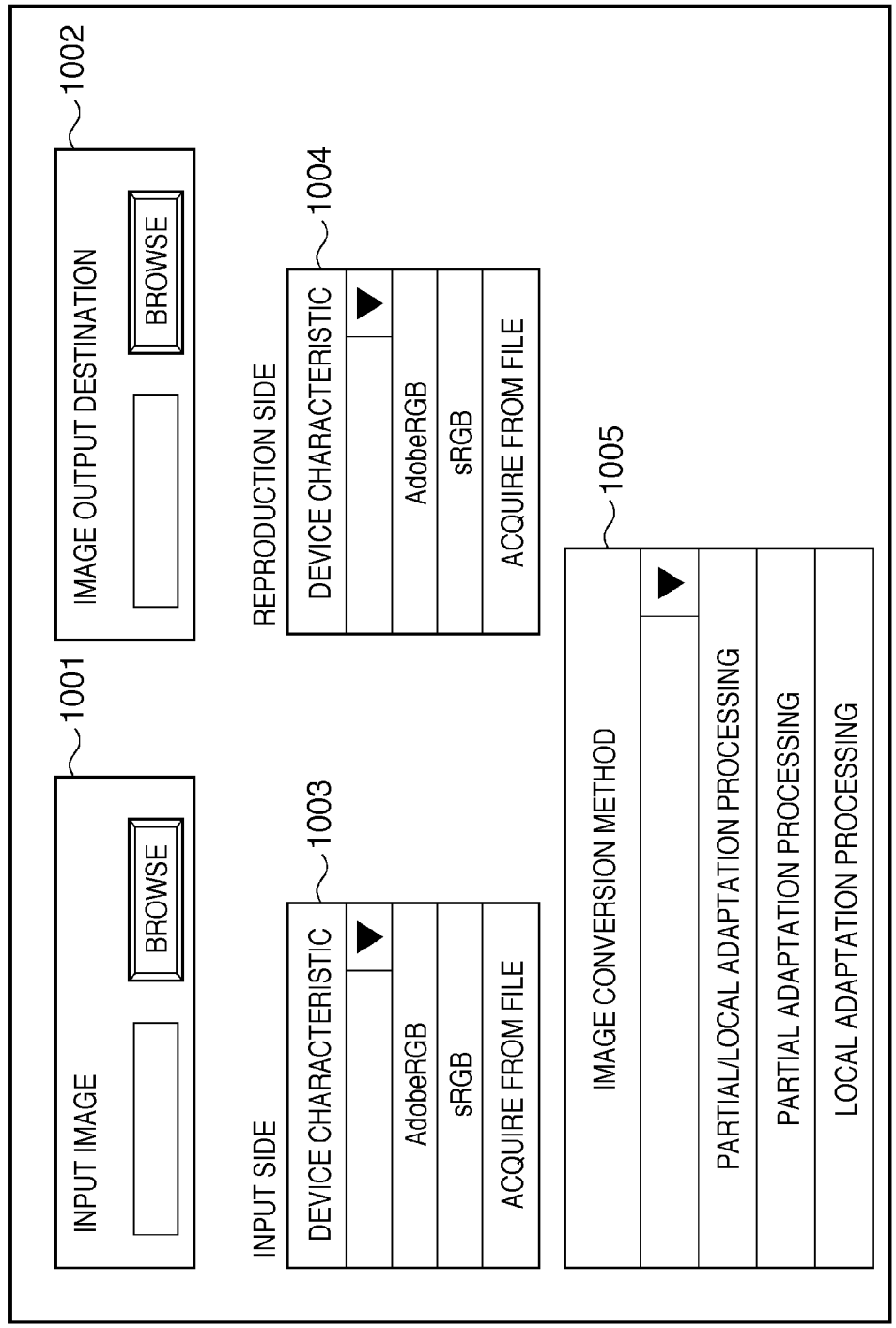
FIG. 2 is a view showing an example of a UI provided by a UI unit.

FIG. 2 is a view showing an example of a UI provided by the UI unit 107.

The user designates image data to be input by operating an input image setting area 1001. Also, the user designates an output destination of image data after processing by operating an image output destination setting area 1002. That is, the user designates image data held in the image data holding unit 102 or an image input device. When the user wants to display an image based on image data after processing on a monitor, he or she designates the monitor. When the user wants to print an image, he or she designates a printer. When the user wants to save an image, he or she designates a memory.

The user designates color reproduction characteristics of an image input device which generated image data to be input by operating a device characteristic setting area 1003 on the input side. The user designates the color reproduction characteristics of an image output device as the output destination of image data after processing by operating a device characteristic setting area 1004 on the reproduction side. When image data output from an image input device or image data input to an image output device is expressed by a color space such as AdobeRGB or sRGB, the user designates AdobeRGB or sRGB. On the other hand, when image data is not expressed by a general color space, the user designates device characteristic data of image input and output devices held in the device characteristic holding unit 104.

The user selects a conversion method of image data to be input by operating an image conversion method setting area 1005. Note that details of the conversion method will be described later.

[Image Processing]

Figure 3:
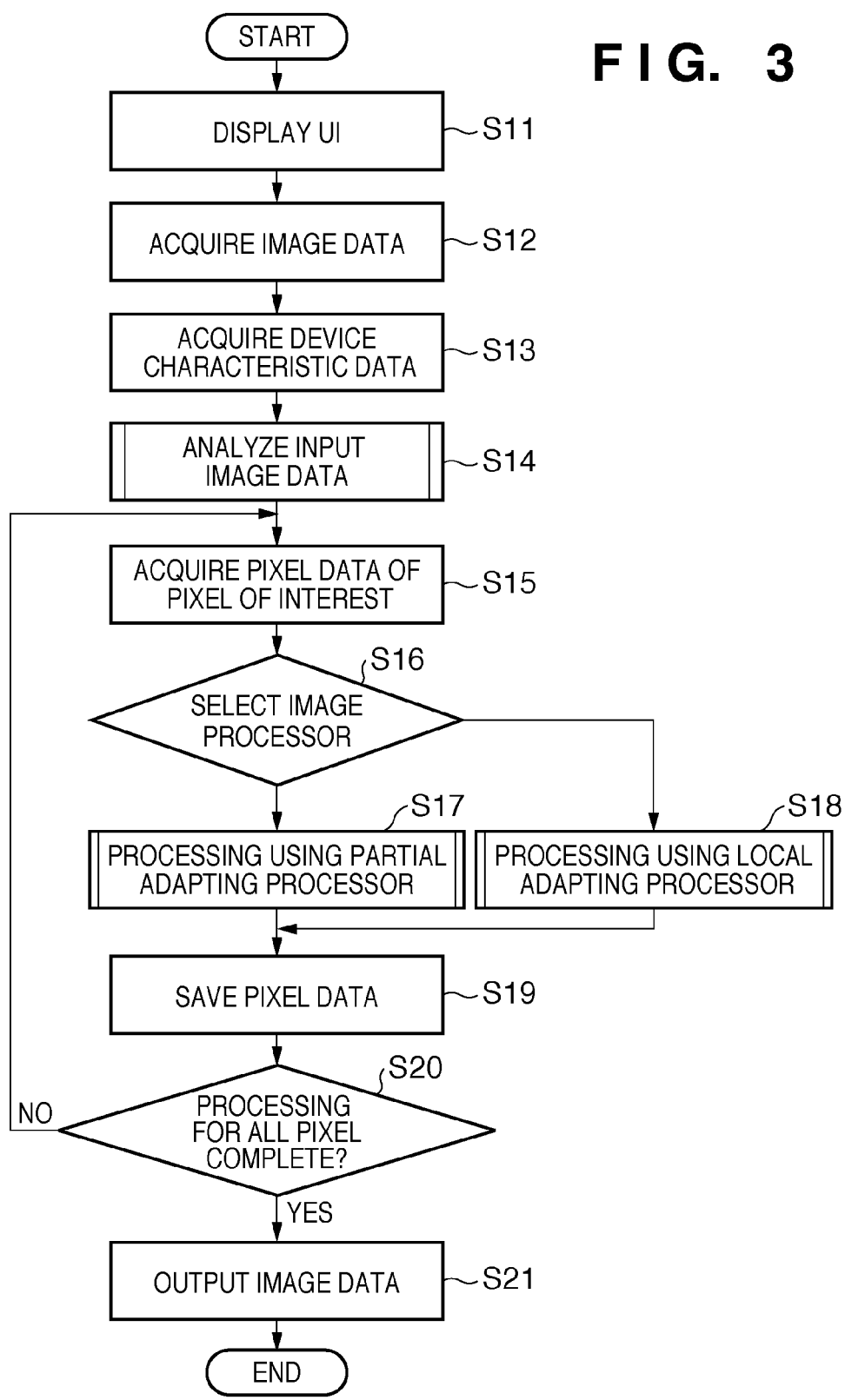
FIG. 3 is a flowchart showing an example of image processing.

FIG. 3 is a flowchart showing an example of image processing, and the controller 109 executes this processing. Note that FIG. 3 shows the processing when the user designates partial/local adaptation processing by operating the image conversion method setting area 1005.

The controller 109 displays the UI shown in FIG. 2, which prompts the user to input information required for image conversion, on the UI unit 107 (S11). The controller 109 controls the image data acquisition unit 103 to acquire image data designated by the user, and stores the acquired image data in the buffer memory 112 (S12). Also, the controller 109 controls the device characteristic acquisition unit 105 to acquire device characteristic data designated by the user (S13).

Note that the device characteristic data describes conversion characteristics from device depending colors (e.g., device RGB values) into device-independent colors (e.g., XYZ values), and CAM parameters. The conversion characteristics include, for example, a combination of an RGB to XYZ gamma matrix and 3×3 conversion matrix, or a conversion lookup table (LUT). In this embodiment, a conversion LUT is used. Note that when the user designates AdobeRGB or sRGB, RGB to XYZ conversion is done based on conversion formulas of the designated color space.

FIG. 4 is a view for explaining the format of the device characteristic data. The CAM parameters include:

XYZ values XwYwZw of a white point, an absolute luminance La of an adapting field: 20% of an absolute luminance Lw of a white point in the adapting field are designated in an example of FIG. 4, a relative luminance Yb of a background: 20% are designated in the example of FIG. 4, and surrounding conditions: normal parameters (an impact c of surrounding, chromatic induction factor Nc, factor F of a degree of adaptation corresponding to surrounding conditions) are designated in the example of FIG. 4.

The conversion LUT describes correspondence between the RGB values and XYZ values of $9^3$ grids obtained by evenly dividing an RGB space. Based on this correspondence, RGB values are converted into XYZ values by, e.g., tetrahedron interpolation.

The controller 109 then controls the image data analyzer 106 to analyze the input image data stored in the buffer memory 112 (S14). The controller 109 acquires data of a pixel of interest from the input image data stored in the buffer memory 112 (S15), and selects an image processor according to the analysis result of the image data analyzer 106 (S16). The controller 109 applies conversion processing to the data of the pixel of interest (S17 or S18), and stores the pixel data after the conversion processing in the buffer memory 112 (S19).

Details of the image data analysis processing and selection of an image processor will be described later. When the user designates partial or local adaptation processing by operating the image conversion method setting area 1005, the controller 109 skips the processes in steps S14 and S16. Then, if the user designates the partial adaptation processing, the controller 109 selects the partial adapting processor 111 as an image processor (S17). If the user designates the local adaptation processing, the controller 109 selects the local adapting processor 110 as an image processor (S18).

The controller 109 repeats the processes in steps S15 to S19 until it is determined in step S20 that the conversion processing of all pixels of the input image data is completed. Upon completion of the conversion processing of all pixels, the controller 109 controls the image output unit 108 to output the image data after the conversion processing stored in the buffer memory 112 to the image output designation designated by the user (S20).

Image Data Analyzer

The image data analyzer 106 analyzes input image data, and detects whether or not the input image data includes a face-image area using a known face detection technique (S14). The face detection technique includes a method using learning represented by a neural network, a method of detecting parts such as eyes and a nose, which have physically characteristic shapes, using template matching, and a method of detecting image feature amounts such as a flesh color and shapes of eyes using statistical analysis. Typical references that disclose the face detection technique are enumerated below:

a method using learning: Rowley et al. "Neural network-based face detection" IEEE TRANSACTIONS ON PATTERN ANALYSIS AND MACHINE INTELLIGENCE, VOL. 20, NO. 1, JANUARY 1998, a detection method using template matching: Yang et al. "Detecting Faces in Images: A Survey" IEEE TRANSACTION ON PATTERN ANALYSIS AND MACHINE INTELLIGENCE, VOL. 24, NO. 1, JANUARY 2002, and a detection method using statistical analysis: Japanese Patent Laid-Open No. 2000-048184.

Selection of Image Processor

The controller 109 selectively uses the partial adapting processor 111 and local adapting processor 110 according to the analysis result (face-image area) of the image data analyzer 106 (S16). That is, if a pixel of interest falls within the face-image area, the controller 109 selects the partial adapting processor 111 (S17). If the pixel of interest falls outside the face-image area, the controller 109 selects the local adapting processor 110 (S18)

Partial Adapting Processor

The partial adapting processor 111 executes color conversion including partial adaptation processing based on CIECAM02 (that is, color conversion based on a color appearance model; to be referred to as "color appearance conversion" hereinafter) (S17). That is, the partial adapting processor 111 converts device RGB values into XYZ values based on the device characteristic data of an input device, and forward converts the XYZ values under a viewing environment on the input side into JCh values on a color appearance space based on CIECAM02 conversion formulas. Then, the partial adapting processor 111 inversely converts the JCh values into XYZ values under a viewing environment on the reproduction side based on CIECAM02 conversion formulas, and converts the XYZ values into device RGB values based on the device characteristic data of an output device. Note that the viewing condition parameters in forward conversion and inverse conversion use CIECAM02 recommended parameters.

When the color temperature at the time of photographing of an image is given, an adapting white point on the input side can be set by calculating the XYZ values of a white point from the color temperature. When the color temperature at the time of photographing of an image is unknown, histograms of the XYZ values of input image data may be created, and mode values in top 5% of the areas of the histograms may be set as a white point XwYwZw. Alternatively, the user may designate D50 or D65 as a reference light source. That is, parameters may be set according to the purpose of image processing. In other words, the partial adapting processor 111 executes partial adaptation processing using white points associated with input and output devices of image data.

Local Adapting Processor

The local adapting processor 110 executes color appearance conversion including local adaptation processing based on iCAM06 (S18). That is, the local adapting processor 110 converts device RGB values into XYZ values based on the device characteristic data of an input device, and forward converts the XYZ values under a viewing environment on the input side into JCh values on a color appearance space based on iCAM06 conversion formulas. Then, the local adapting processor 110 inversely converts the JCh values into XYZ values under a viewing environment on the reproduction side based on iCAM06 conversion formulas, and converts the XYZ values into device RGB values based on the device characteristic data of an output device.

Upon execution of the color appearance conversion based on iCAM06, since the viewing condition parameters are locally calculated from an image, the CAM parameters described in the device characteristic data need not be used.

In place of iCAM06, another local adaptation processing model such as iCAM may be used, or CIECAM02 may be used by locally calculating adapting white points. When CIECAM02 is used, an adapting white point is calculated according to surrounding pixels of a pixel of interest, in other words, according to the spatial position of the pixel of interest. For example, an adapting visual field is defined as ⅓ of the width of an input image, and XYZ values obtained by smoothing those of the adapting visual field by processing using a Gaussian filter are set as an adapting white point. The Gaussian filter is described by:

$$Img'(x, y) = \Sigma\Sigma Img(x-a, y-b)F(a, b) \quad (1)$$

where (x, y) represents the coordinates (x=0, ..., W, y=0, ..., H) of a pixel,

Img represents the XYZ values of an input image,

Img' represents the XYZ values of an image after the filter processing, (a, b) represents relative coordinates from the filter center, F(a, b) is a Gaussian filter (equation (2)), and letting S be the radius of an adapting field, a Σ operation is made within the range of a and b=−S to +S.

$$F(a, b) = (1/k)\exp\{-(a^2+b^2)/2(S/2)^2\} \quad (2)$$

$$\text{for } k = \Sigma_{a=-S}^{+S}\Sigma_{b=-S}^{+S}\exp\{-(a^2+b^2)/2(S/2)^2\}$$

$$-S \leq a \leq +S$$

$$-S \leq b \leq +S$$

In this manner, when input image data undergoes color appearance conversion, the partial adaptation processing is applied to pixels included in the face-image area of input image data, and the local adaptation processing is applied to pixels outside the face-image area. Therefore, color reproduction of an important memory color such as a flesh color is held, and the color of the face image can be preferably reproduced while preventing the problem of an unnatural color of the face image when an object having a high-chroma color exists around the face-image area.

Second Embodiment

Color processing according to the second embodiment of the present invention will be described below. Note that the same reference numerals in the second embodiment denote the same components as in the first embodiment, and a detailed description thereof will not be given.

In the second embodiment, the processing of a local adapting processor 110 and that of a partial adapting processor 111 are switched according to the spatial frequency characteristics of input image data.

Image Data Analyzer

An image data analyzer 106 creates an edge image from input image data using a Sobel filter (S14). Note that an edge image may be created using an edge extraction filter other than the Sobel filter.

Figures 5A, 5B:
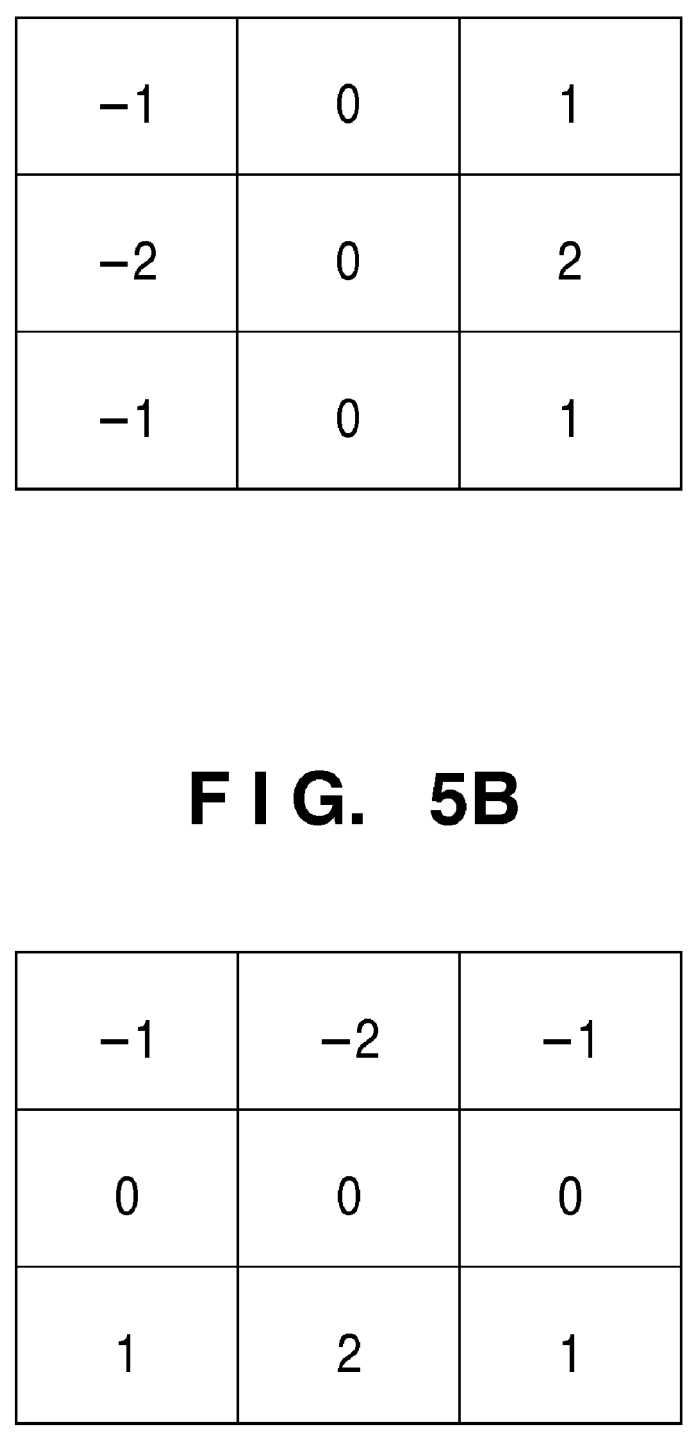

FIGS. 5A and 5B are views showing Sobel filters of 3×3 pixels. The filter shown in FIG. 5A extracts a horizontal edge, and that shown in FIG. 5B extracts a vertical edge.

Selection of Image Processor

A controller 109 refers to the created edge image in step S16. If a pixel of interest is included in the edge image, since the controller 109 determines that the pixel of interest is located in a high spatial frequency area, it selects the local adapting processor 110 as an image processor (S18). On the other hand, if the pixel of interest is not included in the edge image, since the controller 109 determines that the pixel of interest is located in a low spatial frequency area, it selects the partial adapting processor 111 as an image processor (S17).

In this manner, when input image data undergoes color appearance conversion, the local adaptation processing is applied to pixels included in the high spatial frequency area of input image data, and the partial adaptation processing is applied to pixels included in the low spatial frequency area. Therefore, the color appearance conversion of pixels in a solid area included in the low frequency area adopts a fixed adapting white point to preferably reproduce the solid area (flat part).

Modification of Embodiments

In the example of the first embodiment, the partial adaptation processing is applied to the face-image area detected by the image data analyzer 106. However, an area to which the partial adaptation processing is to be applied is not limited to the face-image area, and the user may designate an area where colors are to be preserved.

In the second embodiment, an image represented by input image data is segmented into areas, and the frequency spectra of the segmented areas are calculated. Also, a threshold is calculated from the frequency spectrum of the input image data. Whether each segmented area is included in a high or low spatial frequency area may be determined using the threshold for respective segmented areas so as to select an image processor.

In the example of the above description, the partial adapting processor or local adapting processor is selected as an image processor for each pixel in accordance with the analysis result of input image data. However, the processing result of the partial adapting processor 111 and that of the local adapting processor 110 may be weighted according to the analysis result for each pixel, and an average value of these weighted processing results may be used as a conversion result.

The method of selecting an image processor for each pixel in accordance with the analysis result of input image data has been explained. Alternatively, an image processor may be selected for each image. That is, the controller 109 selects the partial adapting processor 111 for an image in which the image data analyzer 106 detects a face-image area or an image including a continuous low-frequency area (flat part or solid area) of a predetermined area or more. Alternatively, the controller 109 may select the partial adaptation processing for an image which is designated by the user to include a face image (or an important solid area) using the UI shown in FIG. 2, and may select the local adaptation processing for an image which is designated by the user not to include a face image (or an important solid area) using the UI.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-223921, filed Sep. 1, 2008, which is hereby incorporated by reference herein in its entirety.

What is claimed is:

1. A color processing apparatus comprising:
    a first processor, configured to calculate a white point of a pixel of interest of image data from surrounding pixels of the pixel of interest, and to execute adaptation processing using the white point;
    a second processor, configured to execute adaptation processing using a fixed white point of image data;
    a selector, configured to select an area of input image data; and
    a color converter, configured to execute color conversion of the input image data using said first or second processor corresponding to the selected area.

2. The apparatus according to claim 1, wherein when the selected area includes a face-image area, said color converter uses said second processor.

3. The apparatus according to claim 1, wherein said selector detects a face-image area included in the input image data, and said color converter applies color conversion using said second processor to image data of pixels included in the face-image area.

4. The apparatus according to claim 1, wherein when the selected area includes a continuous flat part of not less than a predetermined area, said color converter uses said second processor.

5. The apparatus according to claim 4, wherein the flat part is designated by a user.

6. The apparatus according to claim 1, wherein said selector selects an edge image from the input image data, and said color converter applies color conversion using said first processor to image data of pixels included in the edge image.

7. A color processing method which is carried out in an information processing apparatus, the method comprising the steps of:
    calculating a white point of a pixel of interest of image data from surrounding pixels of the pixel of interest;
    executing adaptation processing using the calculated white point;
    executing adaptation processing using a fixed white point of image data;
    selecting an area of input image data; and
    executing color conversion of the input image data using the adaptation processing in the first or second executing step corresponding to the selected area.

8. A computer-readable storage medium storing a computer-executable program for causing a computer to execute a color processing method, the method comprising the steps of:

calculating a white point of a pixel of interest of image data from surrounding pixels of the pixel of interest;

executing adaptation processing using the calculated white point;

executing adaptation processing using a fixed white point of image data;

selecting an area of input image data; and executing color conversion of the input image data using the adaptation processing in the first or second executing step corresponding to the selected area.

* * * * *